United States Patent
Dack et al.

(10) Patent No.: US 9,894,724 B2
(45) Date of Patent: Feb. 13, 2018

(54) PORTABLE LIGHTING SYSTEM

(71) Applicant: Lind Equipment Ltd., Markham (CA)

(72) Inventors: Stuart Alan Dack, Toronto (CA);
Brian Charles Astl, Toronto (CA);
Sean Robert Van Doorselaer, Toronto (CA)

(73) Assignee: Lind Equipment Ltd., Markham (CA)

( * ) Notice: Subject to any disclaimer, the term of this patent is extended or adjusted under 35 U.S.C. 154(b) by 234 days.

(21) Appl. No.: 14/759,887

(22) PCT Filed: Jan. 16, 2014

(86) PCT No.: PCT/CA2014/050026
§ 371 (c)(1),
(2) Date: Jul. 8, 2015

(87) PCT Pub. No.: WO2014/110677
PCT Pub. Date: Jul. 24, 2014

(65) Prior Publication Data
US 2015/0359060 A1   Dec. 10, 2015

Related U.S. Application Data

(60) Provisional application No. 61/753,268, filed on Jan. 16, 2013.

(51) Int. Cl.
*H02J 9/00* (2006.01)
*H05B 33/08* (2006.01)
*H02J 9/06* (2006.01)
*H02J 7/00* (2006.01)
*H02J 7/34* (2006.01)

(52) U.S. Cl.
CPC ........ *H05B 33/0845* (2013.01); *H02J 7/0068* (2013.01); *H02J 9/061* (2013.01); *H05B 33/0842* (2013.01); *H02J 7/345* (2013.01); *H02J 9/065* (2013.01); *Y10T 307/336* (2015.04); *Y10T 307/344* (2015.04)

(58) Field of Classification Search
CPC ............ H05B 33/0803; H05B 33/0845; H05B 33/0815; H02J 9/065; H02J 7/345; H02J 9/00; H02J 9/061; H02J 9/02; Y10T 307/336; Y10T 307/344
See application file for complete search history.

(56) References Cited

U.S. PATENT DOCUMENTS

| | | |
|---|---|---|
| 5,661,645 A | 8/1997 | Hochstein |
| 7,323,849 B1 | 1/2008 | Robinett et al. |
| 7,569,996 B2 | 8/2009 | Holmes et al. |
| 7,878,668 B2 | 2/2011 | Martinez |
| 8,274,229 B2 | 9/2012 | Yang |
| 8,686,662 B1 * | 4/2014 | Bragg ..................... H02J 7/345 315/159 |

(Continued)

*Primary Examiner* — Rexford Barnie
*Assistant Examiner* — Rasem Mourad
(74) *Attorney, Agent, or Firm* — McMillan LLP (57) ABSTRACT

An LED lighting system including an LED array including one or more LED lights, a main power supply supplying power to the LED array, and an emergency power source supplying short-term power to the LED array upon detection of a loss of power from the main power supply. The emergency power source consists of a super capacitor array charged by the main power source.

7 Claims, 6 Drawing Sheets

(56) References Cited

U.S. PATENT DOCUMENTS

| | | | |
|---|---|---|---|
| 2008/0094042 A1* | 4/2008 | Ferrario | G03B 15/05 323/234 |
| 2010/0315013 A1* | 12/2010 | Li | H05B 33/0815 315/185 R |
| 2010/0320913 A1* | 12/2010 | Wu | H05B 33/0803 315/86 |
| 2011/0049993 A1* | 3/2011 | Yang | H05B 33/0809 307/66 |
| 2011/0215654 A1* | 9/2011 | Kumar | H02M 3/06 307/109 |
| 2012/0001548 A1 | 1/2012 | Recker et al. | |
| 2012/0043889 A1* | 2/2012 | Recker | H05B 33/0815 315/86 |
| 2012/0104973 A1* | 5/2012 | Hsieh | H05B 33/0821 315/297 |
| 2013/0063035 A1* | 3/2013 | Baddela | H05B 33/086 315/192 |
| 2013/0076141 A1* | 3/2013 | Paulakonis | H02J 7/345 307/66 |
| 2015/0108896 A1* | 4/2015 | Gordin | H02J 9/065 315/86 |

* cited by examiner

PORTABLE LIGHTING SYSTEM

FIELD OF THE INVENTION

The present invention relates generally to portable lighting systems, and more particularly to a portable lighting system having emergency backup power capabilities.

BACKGROUND OF THE INVENTION

Portable lighting systems are generally known in the art. Commonplace examples include garden lights, Christmas tree lights, and the exemplary implementation to which the current invention is directed, temporary shelter lights, such as tent lights. Such shelters or tents may include military-style shelters that are portable, but adapted for extended use or personal tents used mainly for recreation purposes.

As the nature of these shelters or tents has their uses in areas where constant and uninterrupted power may be unreliable or prone to failure, there is a need in the art to provide emergency back-up power, at least on a temporary basis. Some solutions contemplated by the prior art have included providing a battery pack that can be connected to the lighting system when a direct power connection fails. However, battery packs are heavy and not always easily transportable. Furthermore, connecting the battery pack once power has failed may be problematic without another light source available, particularly within an enclosed shelter or after daylight hours.

Other prior art solutions to temporary and portable lighting problems tend to be expensive, difficult to transport, and sometimes unsuitable for military applications, as would be the case for typical battery back backup systems. In addition, the power level of battery backs have to be periodically monitored to ensure that sufficient power is left in the battery pack, making these systems not entirely failsafe.

Accordingly, there is a need in the art for an improved portable lighting system, and in particular one that incorporates emergency power capabilities.

SUMMARY OF THE INVENTION

There is disclosed a portable lighting system, such as a lighting system arranged as a series of LED lights along a wire, that is capable of maintaining a minimum light intensity for a predetermined period of time, after a loss of electrical communication with an external power source. This capability is provided without the use of batteries, and in particular by providing a super capacitor pack that stores an electrical charge and releases this charge over a relatively short period of time. Accordingly, in the event of a loss to the primary power supply, the super capacitor pack is capable of providing emergency power to the lighting system for a temporary period that would permit, for example, other actions to be taken to restore power or to adapt to the ultimate loss of power.

Accordingly, in one embodiment of the invention, there is provided an LED lighting system including an LED array including one or more LED lights, a main power supply supplying power to the LED array, and an emergency power source supplying short-term power to the LED array upon detection of a loss of power from the main power supply.

According to one aspect of the invention, the emergency power source comprises a super capacitor array.

According to another aspect of the invention, the main power supply is a 24VDC power supply.

According to another aspect of the invention, there is further provided an external AC power source and wherein the main power supply converts the AC power into the 24VDC power.

According to another aspect of the invention, the super capacitor array is connected to be charged by the main power supply.

According to another aspect of the invention, the short-term power consists of between about 30 seconds to 120 seconds of power.

According to another aspect of the invention, the super capacitor array is connected between the main power supply and the LED array.

According to another aspect of the invention, there is provided a means for detecting a loss of power enabling the super capacitor array to provide power to the LED array.

According to another aspect of the invention, the means for detecting a loss of power includes a feedback circuit to the super capacitor array.

According to another aspect of the invention, there is provided a boost regulator connected between the super capacitor array and the LED array to provide constant current to the LED array when the super capacitor array is supplying power to the LED array.

According to another aspect of the invention, there is provided a first white light power supply connected to white LEDS within the LED array, a second white light power supply connected to the white LEDs, and a green light power supply connected to green LEDs within the LED array. According to another aspect of the invention, the super capacitor array provides emergency power to the white LEDS only by being connected between the first white light power supply and the white LEDs; and between the second white light power supply and the white LEDs.

BRIEF DESCRIPTION OF THE DRAWINGS

Embodiments will now be described, by way of example only, with reference to the attached Figures, wherein.

DETAILED DESCRIPTION OF THE EMBODIMENTS

While the invention will be described below with respect to certain exemplary arrangements, and applications, it will be understood by a person skilled in the art that these are provided by way of example only. The application of super capacitor packs to provide emergency power to portable lighting systems, and various ways of applying and implementing this backup system are considered within the scope of the invention.

In an exemplary situation, a portable lighting system consisting of a series of LED (light emitting diode) lights connected together along a conductive wire string is provided. The lighting system can then be arranged expeditiously within an enclosed space, like a temporary military shelter of tent. On occasion, such temporary shelters are used for extended periods of time, as may occur during extended use at a military camp. Thus, while for the majority of the time a permanent, hard-wired power sources is available, these power sources may experience field incidents that cause them to fail. While battery backups are possible, these required a user to find the battery pack and connect the lighting system, which may not always be possible in the dark. Thus, the system of the invention provides for a temporary, emergency power source that permits action to be taken during a loss of power. The inventive aspects of the system are not intended to provide complete replacement power, but rather to prevent a catastrophic loss of power to the portable lighting system without warning, by providing temporary power to the lighting system such that action can be taken, either to rectify the loss of power, or to adapt to it, for example. When implemented, the LED lights are typically installed within a lighting enclosure which provides semi-permanent lighting with the ability to provide short-term emergency power during events of catastrophic power loss. Optionally, medium-term emergency power may also be provided by way of battery back-up. However, it is preferred that no battery back-up is provided within the enclosure itself, and is rather separately attachable since an on-board battery back-up would add significant weight to the portable lighting system, which is undesirable.

Figure 1:
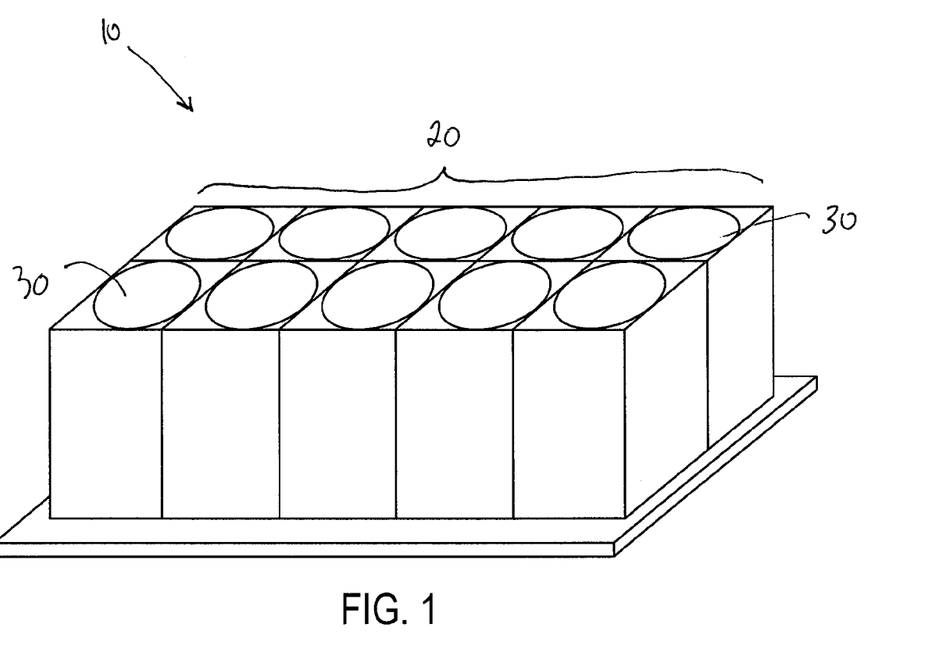
FIG. 1 shows an exemplary super capacitor pack in accordance with one embodiment of the invention.

Referring now to FIG. 1, there is shown an emergency power module 10 to be integrated within the power control circuitry of an LED lighting system. The emergency power module 10 includes an array 20 of super capacitors 30. As illustrated, a two by five array is shown, but the size of the array is scalable and adaptable to the size of the LED lighting system. Preferably the pack is assembled into a standalone pack to which the lighting system has easy access, for example by being connected directly to the portable lighting system, or integrated within its control circuitry. The pack may also includes quick-connect fittings for easy replacement of each individual super capacitor, as may be required. Such quick-connect fittings are generally available as off-the-shelf components and are thus not described herein in further detail.

For the purposes of the invention, the super capacitor array 20 functions by storing a charge and then releasing the charge over a relatively short period of time. Recent capacitor technology is allowing for higher capacitances, lower charge time, longer life cycles and a higher range of charge/discharge cycles. One example of a super capacitor 30 is produced at sold by Maxwell Technologies™, and has the following characteristics:

Supplier: Maxwell Technologies
Capacitance: 25 Farad
Voltage: 2.5V each, 10 in series (to provide 25V)
Lifetime: 10 years at 25° C. (1000 hours at 85° C.)
Energy storage capacity: 540 Joules
Charge time: approximately 15 minutes
Discharge regulation: "boost" regulator to provide constant current to LEDs These characteristics would be typical of super capacitors 30 which could be used in the array 20 in standard-sized LED lighting systems. Variations are contemplated depending on the number of LEDs requiring emergency power, for example. In typical LED portable lighting systems as contemplated by the invention, the array of super capacitors 20 as described above would be able to maintain a minimum of 30 lux of white light at a distance of approximately 8 feet for at least 90 seconds. This is possible using the Maxwell Technologies' super capacitors described above in a two by five array as illustrated in FIG. 1.

Figure 4A:
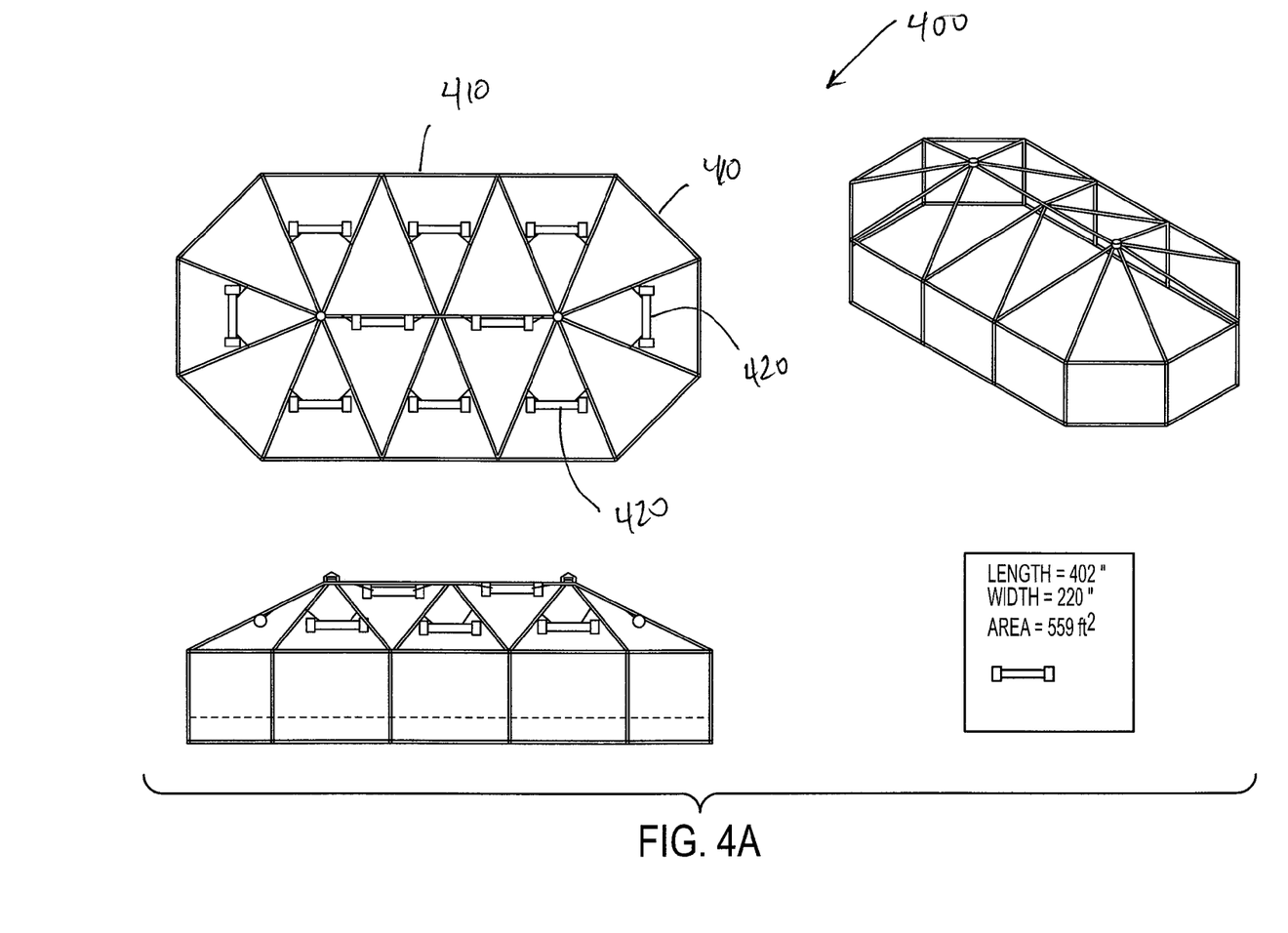
FIGS. 4a-4c shows one embodiment of the lighting system of the invention in an exemplary shelter
Figure 4B:
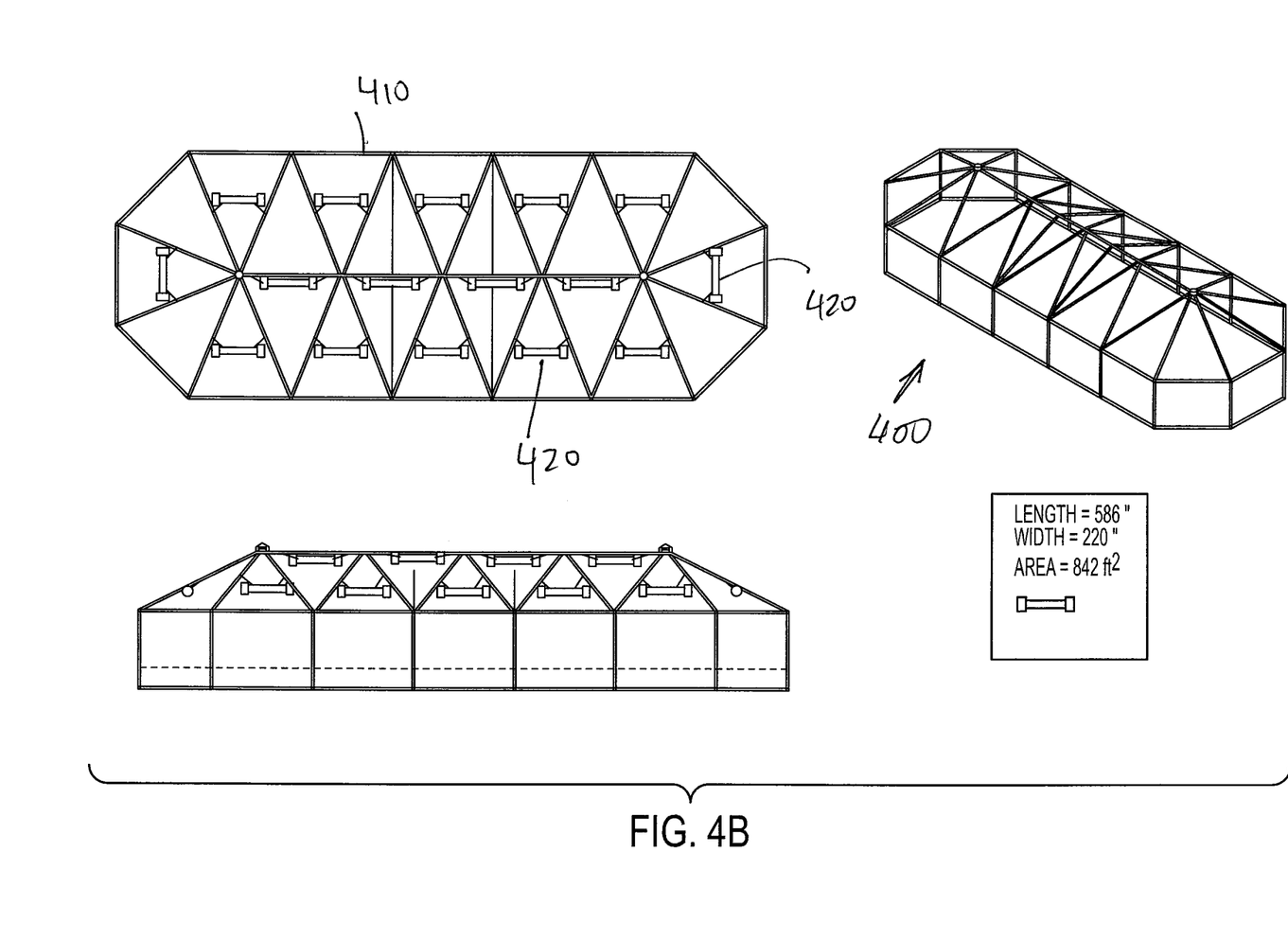
Figure 4C:
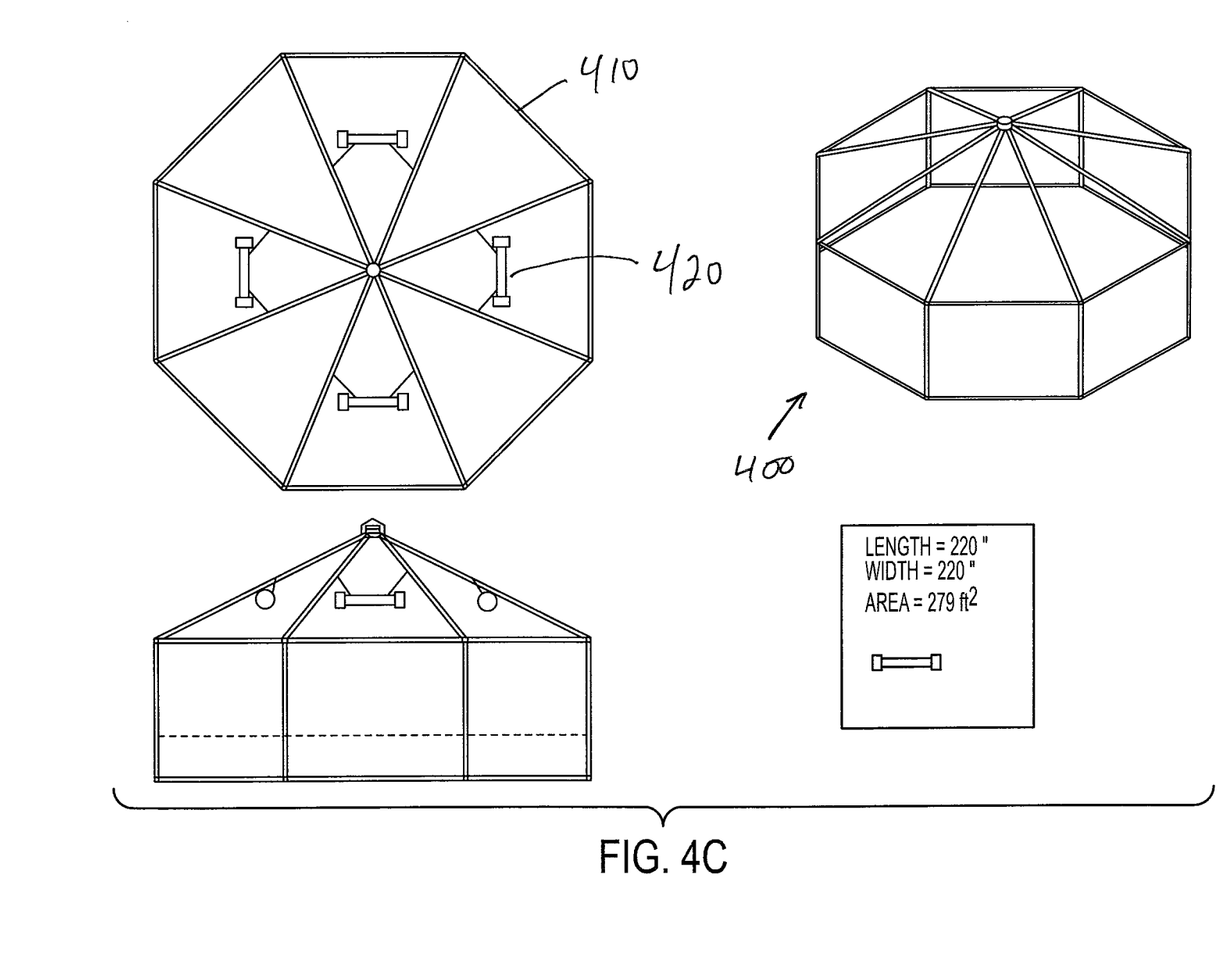

FIGS. 4A to 4C show temporary or semi-temporary, field installable enclosures that are typically used in military settings. These enclosures 400 are typically constructed of a series of quickly connectable beams and struts 410 which are adapted to hold a tent-like material to form the enclosure. The LED lighting system of the invention is well suited to provide lighting in these conditions, where the likelihood of a loss of electrical power is high, and specific advantages are to be had from short term power. Each LED light 410 includes a series of LED bulbs (not shown) in electrical connection with the super capacitor pack 10 of FIG. 1. A number of LED lights 420 may be used, and each one preferably has its own super capacitor pack 10.

Individual lights 420 within the lighting system are preferably daisy-chained together, but other types of connections are also possible. Attachment elements for connecting the lighting system within the shelter, tent or other environment are considered known to those skilled in the art and thus not described in further detail.

One object of the LED lighting system in combination with the super capacitor is to provide sufficient lighting conditions within the military shelter for a period of time that permits personnel within the shelter to take actionable steps to either restore long-term power or to adapt to the loss of power.

Figure 2:
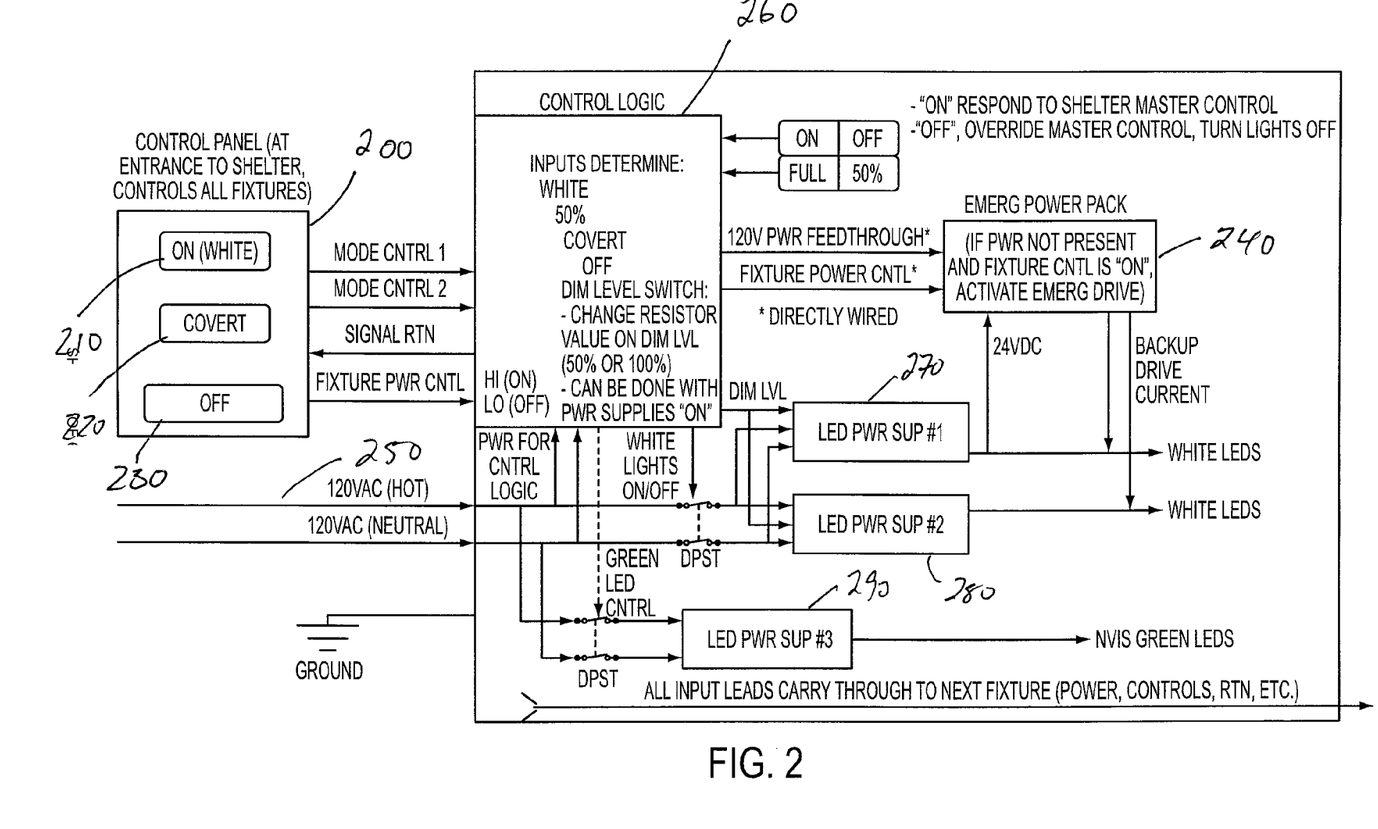
FIG. 2 shows a schematic of the control and wiring
Figure 3:
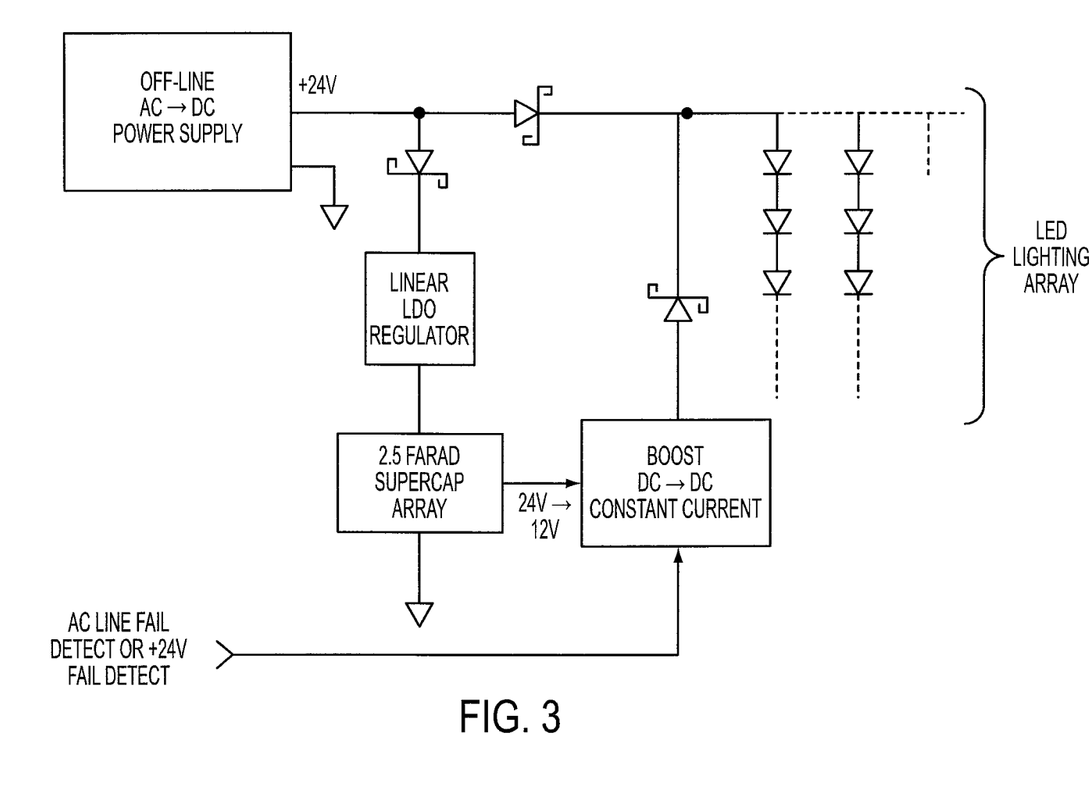
FIG. 3 is a schematic of the emergency power sub-system.

FIGS. 2 and 3 show control circuitry for the LED lighting system according to the invention. As illustrated in FIG. 2, the lighting system is preferably provided with two power modes to be used during normal operation to limit the power consumption of the lighting system. In an exemplary embodiment, the two power modes for white lighting are at 50% and 100% intensity, respectively. Optionally, a green lighting mode is also provided to be made compatible with modern (GEN III) night vision technology, such as those used by most NATO member countries.

The control panel 200 has switches for the white mode 210, the covert (green) mode 220 and a power switch 230. While the general operation of such circuits is well known, it is noted that the emergency power pack 240 consisting of the super capacitor pack as earlier described, is in communication with the power source 250 and with the controller 260. Thus, as soon as power is provided to the power pack 240, it is charged. The power to the power pack 240 is directed through the controller 260. The power pack 240 is connected to LED power supplies 270 and 280 which provide converted power to the white LEDs only. A third power supply 290 supports the green LEDs for the covert mode. The LED power supplies are known devices which convert incoming 120V power into 24V DC to power the individual LEDs. As illustrated, upon detecting a loss of power for the LED power supplies 270, 280, the power pack 240 discharges energy to the individual LEDs to provide for emergency lighting. FIG. 3 shows an exemplary circuit which could be used to implement the feeding of emergency power to the LED array. As shown, the power cap containing the super capacitor array is charged from the 24VDC supplied from the main power supply. The super capacitors discharge from 24V down to 12V during operation of the emergency mode. The boost regulator is used to maintain constant current to the LEDs.

As previously discussed, the lighting system preferably includes four modes two white light modes, the green light mode, and the emergency mode in which power is provided by the super capacitor pack. Exemplary operating conditions of the four modes are identified below:

Mode 1: 100% Power White Light
Light Output: >6,300 lumens from fixture (approximate)
Correlated Color Temperature: 4000K to 5300K Luminous Intensity Profile: 10 fixture provide between 540 and 700 lux for 80% of a 52 m² area, 30" off the ground, when mounted to enclosure ceiling at 88" from ground.

Mode 2: 50% Power White Light

Light Output: >3,150 lumens from fixture (approximate).

Correlated Color Temperature: 4000K to 5300K.

Luminous Intensity Profile: 10 fixtures must provide between 270 and 350 lux for 80% of a 52 m² area, 30" off the ground, when mounted to enclosure ceiling at 88" from ground.

Mode 3: NVIS Green A Compatible

Light Output: >301 lumens from fixture.

Color Coordinates: NVIS Green A color limits per MIL-STD-3009

Radiance: shall not emit any electromagnetic radiation capable of being detected and amplified by GEN III or better Image Intensification devices located within 30 m of the fixture.

Luminous Intensity Profile: 10 fixtures must provide between 40 and 75 lux for 80% of a 52 m² area, 30" off the ground, when mounted to enclosure ceiling at 88" from ground.

Mode 4: Emergency Power Mode

Light Output: >156 lumens from fixture.

Correlated Color Temperature: 4000K to 5300K.

Luminous Intensity Profile: 10 fixtures must provide minimum of 30 lux for 80% of a 52 m² area, 30" off the ground, when mounted to enclosure ceiling at 88" from ground.

Various ways of implementing the changes between modes 1, 2 and 3 will be known by a person skilled in the art, and would typically include electrical switches. The lighting system can be manufactured to meet various standards, and particularly those relevant to implementation in military environments where the lighting system is used in military shelters. Exemplary standards include:

CSA C22.2 No. 250.13-12 LED Equipment for Lighting Applications.

CSA C22.2 No. 12-1982 Portable Luminaires.

CSA C22.1 No. 141—Unit Equipment for Emergency Lighting.

CSA C22.1 No. 184—Solid State Lighting Controls.

MIL-STD-3009 Lighting, Aircraft, Night Vision Imaging System Compatibility.

MIL-STD-461 Requirements for the Control of Electromagnetic Interference.

MIL-STD-810G Environmental Engineering Considerations and Laboratory Tests.

It will become apparent to a person skilled in the art, in view of this description that the ability to provide power to the lighting system upon loss of a primary power source, and without the need for a battery pack is of benefit over prior art systems for providing backup, or alternate sources of power.

The above-described embodiments are intended to be examples of the present invention and alterations and modifications may be effected thereto, by those of skill in the art, without departing from the scope of the invention.

The invention claimed is:

1. An LED lighting system comprising:
    an LED array including one or more LED lights;
    a main power supply for receiving AC power and supplying DC power to the LED array;
    an emergency power pack comprising:
        an AC power input for receiving the AC power;
        a DC power input for receiving the DC power;
        a super capacitor array for supplying short-term power to the LED array upon detection of a loss of power from the main power supply; wherein said super capacitor array is electrically connected to said main power supply and said LED array;
        means for detecting a loss of power enabling said super capacitor array to provide power to said LED array; said means determining that said loss of power has occurred when no signal is present at said power inputs; wherein said means for detecting a loss of power includes a feedback circuit comprising a low dropout regulator connected to said super capacitor array; and
        a boost regulator connected between said super capacitor array and said LED array to provide constant current to said LED array when said super capacitor array is supplying power to said LED array.

2. The LED lighting system according to claim 1, wherein the main power supply comprises:
    a first power supply connected to white LEDs within said LED array;
    a second power supply connected to said white LEDs; and
    a third power supply connected to non-white LEDs within said LED array.

3. The LED lighting system according to claim 2, wherein said super capacitor array provides emergency power to said white LEDs only by being connected between said first power supply and said white LEDs; and between said second power supply and said white LEDs.

4. The LED lighting system according to claim 1, wherein said main power supply is a 24 VDC power supply.

5. The LED lighting system according to claim 4, further comprising an external AC power source and wherein said main power supply converts said AC power into the 24 VDC power.

6. The LED lighting system according to claim 1, wherein said super capacitor array is connected to be charged by said main power supply.

7. The LED lighting system according to claim 1, wherein said short-term power consists of between about 30 seconds to 120 seconds of power.

\* \* \* \* \*